United States Patent
Lei et al.

(10) Patent No.: US 10,642,292 B2
(45) Date of Patent: May 5, 2020

(54) METHOD AND APPARATUS FOR COMPONENT TEMPERATURE CONTROL THROUGH SWITCHING

(71) Applicant: FORD GLOBAL TECHNOLOGIES, LLC, Dearborn, MI (US)

(72) Inventors: Oliver Lei, Windsor (CA); Allen R. Murray, Lake Orion, MI (US); Nicholas Colella, Grosse Ile, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/819,957

(22) Filed: Nov. 21, 2017

(65) Prior Publication Data

US 2019/0155319 A1    May 23, 2019

(51) Int. Cl.
*G05D 23/19* (2006.01)
*H04W 4/14* (2009.01)
*G05B 15/02* (2006.01)

(52) U.S. Cl.
CPC ......... *G05D 23/1917* (2013.01); *G05B 15/02* (2013.01); *H04W 4/14* (2013.01)

(58) Field of Classification Search
CPC .................................................. G05D 23/1917
See application file for complete search history.

(56) References Cited

U.S. PATENT DOCUMENTS

| | | | | |
|---|---|---|---|---|
| 6,731,613 | B1* | 5/2004 | Provance | H04W 52/343 370/230 |
| 9,018,804 | B2* | 4/2015 | Saladin | B60R 16/03 307/116 |
| 9,043,797 | B2 | 5/2015 | Rabii | |
| 9,113,474 | B2* | 8/2015 | Kim | H04W 72/048 |
| 9,125,028 | B2 | 9/2015 | Perner | |
| 2011/0295444 | A1* | 12/2011 | Westra | G06F 21/30 701/1 |
| 2015/0027808 | A1* | 1/2015 | Baillargeon | B66F 17/006 182/3 |
| 2015/0282085 | A1* | 10/2015 | Enomoto | H04W 52/0225 455/574 |
| 2016/0062423 | A1* | 3/2016 | Kim | G06F 1/206 713/320 |
| 2016/0127060 | A1* | 5/2016 | Cross | H04B 7/18508 375/211 |
| 2017/0108912 | A1* | 4/2017 | Li | G06F 1/3209 |
| 2017/0372599 | A1* | 12/2017 | Choi | G08C 17/02 |

* cited by examiner

*Primary Examiner* — Thomas C Lee
*Assistant Examiner* — Charles Cai
(74) *Attorney, Agent, or Firm* — Mike Spenner; Brooks Kushman P.C.

(57) ABSTRACT

A system includes a processor configured to determine that a telematics control unit component temperature is above a predefined maximum temperature. The processor is also configured to send a message to a remote communication server notifying the server that packet communication will be disabled and disable packet communication, responsive to the determination. The processor is further configured to enable binary user-data-embedded SMS message handling for remote commands received from the server, responsive to disabling the packet communication.

8 Claims, 3 Drawing Sheets

METHOD AND APPARATUS FOR COMPONENT TEMPERATURE CONTROL THROUGH SWITCHING

TECHNICAL FIELD

The illustrative embodiments generally relate to methods and apparatuses for component temperature control through switching.

BACKGROUND

Many vehicles now include onboard telematics capabilities, allowing the vehicle to remotely communicate with external communication devices, even when the vehicle is parked and an owner is away from the vehicle. In current models, remote services accessed through, for example, a user mobile device, cause a vehicle telematics control unit (TCU) to wake, a process caused through a wake-up short message service (SMS). The TCU can then establish a packet connection to a backend server, which allows the TCU to retrieve the command (e.g., unlock). The retrieved command can then be executed at the vehicle to perform the requested action. Further, the TCU is often mounted proximate to a roof antenna for convenience and to save on component elements such as coaxial or other cabling.

When a vehicle is parked in summer sun, for example, and the exterior ambient temperature is high, the vehicle ambient temperature can be even higher through sun-absorption. This process can cause TCU temperatures above 85 degrees Celsius, which can exceed a maximum operational temperature for the TCU. Operating the TCU under these conditions runs the risk of permanently damaging the TCU, and incurring an expensive repair cost for a vehicle owner.

SUMMARY

In a first illustrative embodiment, a system includes a processor configured to determine that a telematics control unit component temperature is above a predefined maximum temperature. The processor is also configured to send a message to a remote communication server notifying the server that packet communication will be disabled and disable packet communication, responsive to the determination. The processor is further configured to enable binary SMS message handling for remote commands received from the server, responsive to disabling the packet communication.

In a second illustrative embodiment, a computer-implemented method includes determining a telematics control unit component temperature. The method also includes sending state-change messages to a backend server, responsive to the temperature crossing a predefined threshold. The method further includes disabling an enabled packet communication capability responsive to the temperature rising above the threshold. The method additionally includes enabling a disabled packet communication capability responsive to the temperature falling below the threshold. Also, the method includes enabling receipt and handling of remote commands received as binary SMS messages while the packet communication capability is disabled.

In a third illustrative embodiment, a system includes a telematics control unit (TCU) processor and a server. The TCU processor is configured to detect a modem temperature above a predefined threshold. The processor is also configured to send a first message to the server, responsive to the temperature. Also, the processor is configured to disregard wake-up messages and process binary messages while the temperature remains above the threshold. In this embodiment, the server is configured to switch vehicle messaging formats from wake-up to binary messages responsive to receiving the first message.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
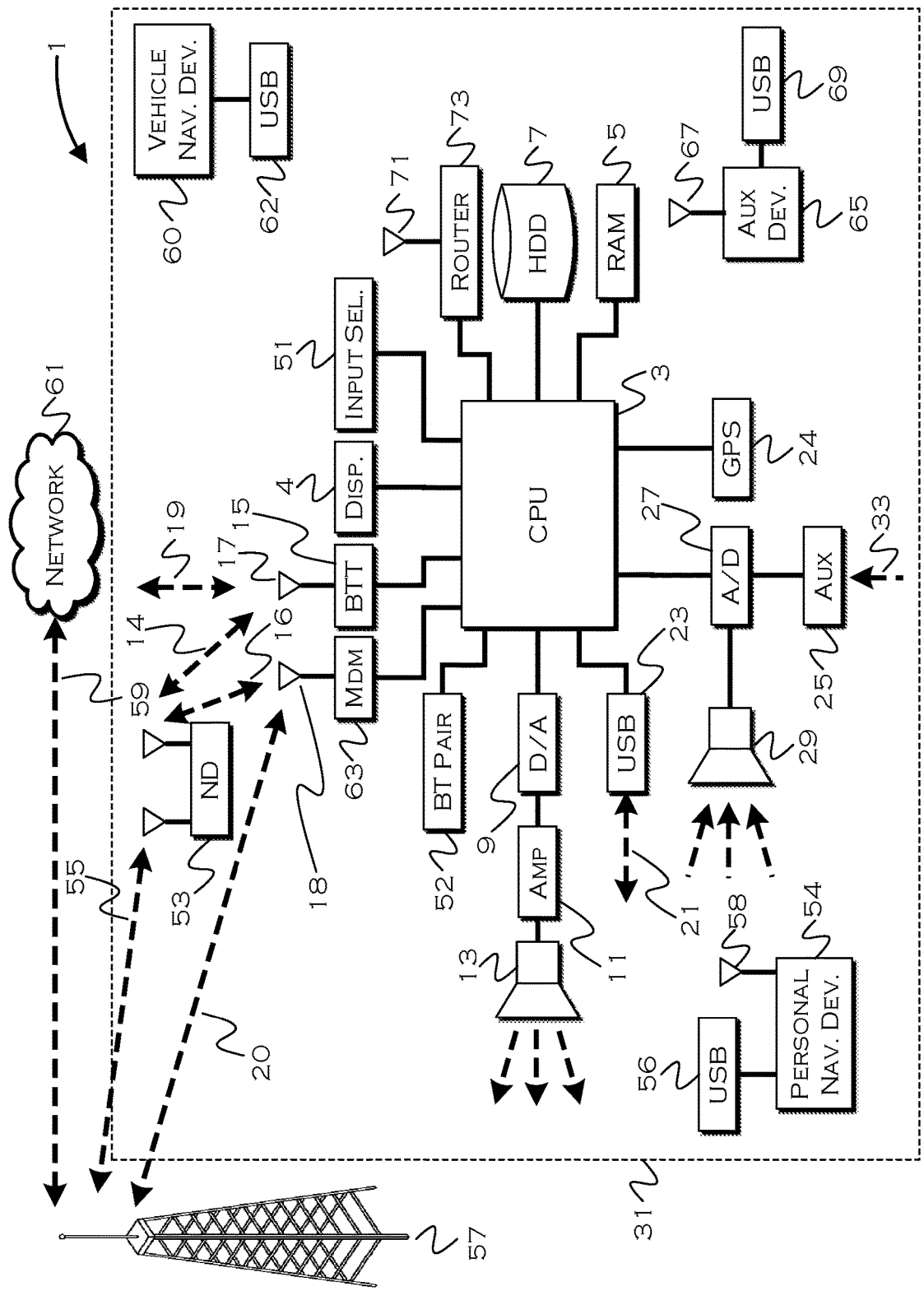
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

When TCU operating temperatures exceed operational parameters, there are several possible actions that could be taken. This can include, for example, simply disabling the TCU, to prevent any damage from operating a TCU outside recommended constraints. While this may prevent damage to the TCU, this may also irritate an owner, who may, for example, be remotely requesting vehicle cool-down, and who may arrive to find a super-heated vehicle because the TCU was disabled and did not process the request.

The illustrative embodiments propose a switching process whereby remote commands can still be processed onboard a vehicle, even if the TCU is heated to a point beyond recommended operational parameters.

Figure 2:
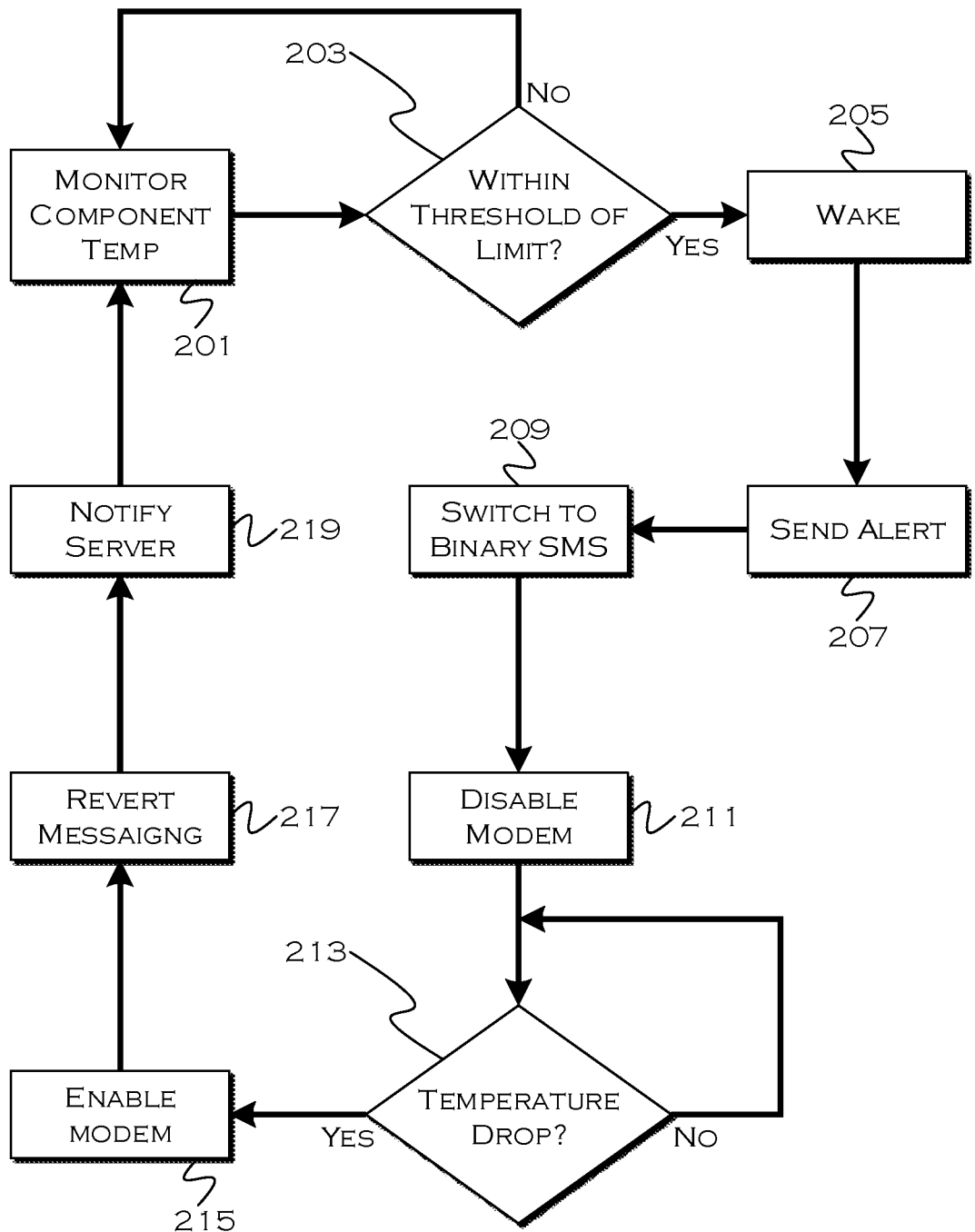
FIG. 2 shows an illustrative temperature monitoring process.

FIG. 2 shows an illustrative temperature monitoring process. In this illustrative embodiment, the onboard process acts to prevent usage of the TCU while the maximum operating temperature is exceeded, but still allows for processing of remote commands issued by a user (commands which would normally be handled by the TCU)

In this example, the process monitors 201 the current temperature of the vehicle TCU (and any other related components). If or when the TCU temperature is within a threshold of an operational limit 203, the process wakes 205 the TCU and sends 207 an alert to a backend server. In this model, the backend server is responsible for communicating commands from a remote device to the TCU, so it acts as an intermediary. Further, it is possible to wait until the TCU temperature actually reaches the limit before sending the alert, and/or wait until the TCU reaches the limit before actually disabling the TCU (from using a packet connection) as discussed below.

In this example, after sending the alert, the process locally switches 209 to expect and handle binary SMS messages and to disable 211 packet connection features of the TCU modem. While in this phase, the TCU will still receive binary SMS messages (which require very limited resources) and will use data embedded in the messages to execute any remotely requested commands. If the temperature begins to drop 213 (below the operational threshold), the process may enable 215 the packet connection functions of the modem and revert 217 to receive the standard or binary SMS messages and subsequent packet connection instructions. At this point, the process may also notify 219 the server of the change, so the server knows that packet connection instructions can again be resumed.

Switching the TCU packet data connection off (and on) can be done at threshold temperatures or within predefined thresholds of those operational limits. So, for example, the process could send a message when the TCU is within 2 degrees of switching off and the temperature has been rising, but if the temperature begins to fall, the process could send another message and forego switching until if and when the temperature rises again. Similarly, the process could wait until the temperature falls more than a threshold below the maximum parameter before notifying the server and rendering the packet connection operational. If the temperature then begins rising, the process could repeat the shutdown procedure.

In another embodiment, the TCU does not actually have to disable the modem capability to establish a packet communication, but rather when the TCU receives a user-data-embedded SMS message, the TCU simply does not attempt to establish the packet communication. In this model, the TCU notifies the server and, since the server switches from wake-up communication SMS messages to SMS messages including embedded data, the behavior of the TCU can simply be keyed to the form of message received.

Since there may be some delay involved in the communication between the TCU and the backend server, the TCU may further set itself to a state whereby wake-up message handling is disabled or wake-up messages are disregarded, responsive to a certain temperature, so that even if a command is received, processed and sent by the server, even as the TCU is informing the server to stop sending such commands due to temperature, the TCU does not accidentally process a command of the wrong format given a current temperature. While this would be a likely infrequent scenario, incorporating such handling (dropping, rejecting or disregarding wake-up messages responsive to temperature) would allow avoidance of any undesirable message handling.

Figure 3:
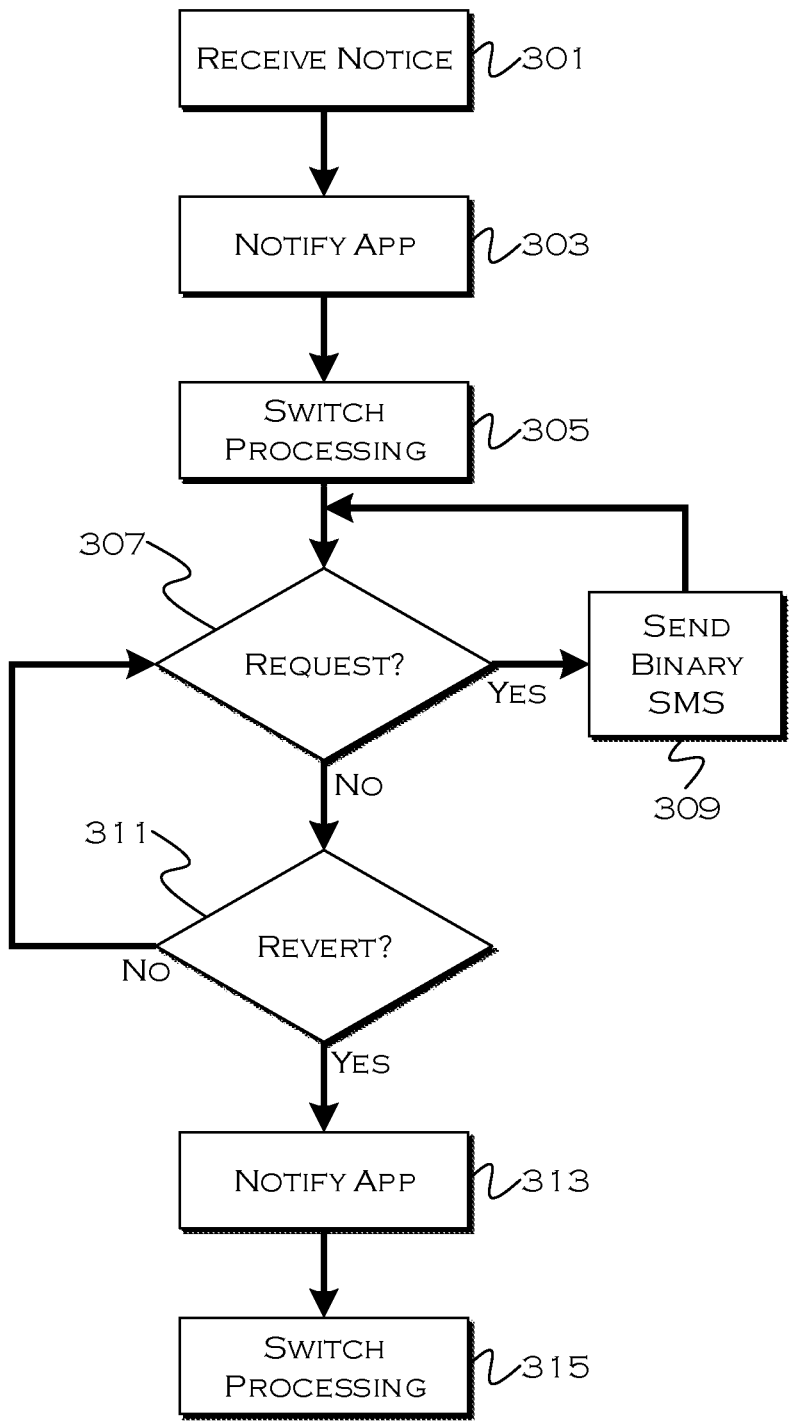
FIG. 3 shows an illustrative backside switching process.

FIG. 3 shows an illustrative backside switching process. In this example, the process executing on the backside server may receive 301 a notification from the TCU that the temperature thereof is at or near an operational limit. If the notice indicates that the TCU will, in fact, disable packet connection, the process can move forward, but if the notice indicates that the TCU is nearing a limit, the process may wait to receive a shut-down notice before moving forward. Whether or not to send the notice and/or disable packet connection at or near an operational limit is a matter of design choice, and could depend on, for example, expected delays in handling, transmission and processing. The decision could also be done onboard and dynamically, and be based on, for example, the speed of temperature change (e.g., a quickly rising temperature causes a "within threshold" notice, while a slowly rising temperature causes the system to wait until the threshold is actually reached).

Once the server has received a notice that the TCU is going to disable the packet connection, the server may notify 303 the user device. Because of the limits on the packet connection, certain data may not be retrievable from the vehicle, for example, and thus the user may need or wish to know about the change in operational status. If any commands are thusly limited, a control application executing on a user device may be similarly limited.

The server may then switch 305 to a binary user-data-embedded SMS processing state, which causes commands to be sent as binary user-data-embedded SMS messages and/or blocks any requests or commands that cannot be sent as binary user-data-embedded SMS messages. When the server receives 307 a request from the user mobile device, the server (if possible) converts the request into a binary user-data-embedded SMS and sends 309 the request to the TCU. Since the request is not formatted to wake the TCU and cause the TCU to establish a packet data connection, but instead includes instructions corresponding to the request (or at least formatting of the request), the TCU can operate in accordance with the request based solely on data retrieved from the binary user-data-embedded SMS.

If and when the server receives 311 a notification that the TCU has reverted to normal operation, the server can again notify 313 the user application and can revert 315 processing back to the standard wake-up SMS+packet data connection format.

Through the illustrative embodiments, a user can maintain at least some level of control over a vehicle through a remote device, such as a smartphone, even if a vehicle TCU temperature exceeds recommended operational limits. This control can be maintained with little fear of damaging the TCU, and the control can switch between limited and full control as dynamically as the TCU temperature switches above and below the operational limits, if desired.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a telematics control unit (TCU) processor; and
   a server, wherein
   the TCU processor is included in a vehicle and is configured to:
      detect an onboard modem temperature above a predefined threshold;
      responsive to the temperature, send a first message to the server, and
      disregard wake-up messages and process messages including embedded vehicle control-instruction data while the temperature remains above the threshold;
   wherein the server is configured to:
      switch messaging formats to the vehicle from wake-up to messages including embedded control-instruction data responsive to receiving the first message.

2. The system of claim 1, wherein the predefined threshold includes a maximum operating temperature.

3. The system of claim 1, wherein the predefined threshold includes a temperature within a predefined range of a maximum operating temperature.

4. The system of claim 1, wherein the first message is an SMS message.

5. The system of claim 1, wherein the wake-up messages and messages including embedded control-instruction data are SMS messages.

6. The system of claim 1, wherein the server is configured to notify a user device of the switch.

7. The system of claim 1, wherein the TCU processor is further configured to:
   detect a modem temperature falling from above the predefined threshold to below the predefined threshold;
   send a second message to the server, responsive to the temperature; and
   resume processing wake-up messages, and establishing packet data connections responsive to wake-up messages, while the temperature remains below the predefined threshold.

8. The system of claim 7, wherein the server is configured to:
   switch the messaging formats from embedded control-instruction to wake-up messages responsive to receiving the second message; and
   notify a user device of the switch to wake-up messages.

* * * * *